United States Patent [19]

Jang

[11] Patent Number: 5,834,328
[45] Date of Patent: Nov. 10, 1998

[54] METHOD FOR FABRICATING LIQUID CRYSTAL DISPLAY

[75] Inventor: Seok Pil Jang, Kyungki-do, Rep. of Korea

[73] Assignee: LG Electronics Inc., Seoul, Rep. of Korea

[21] Appl. No.: 846,099

[22] Filed: Apr. 25, 1997

[30] Foreign Application Priority Data

May 15, 1996 [KR] Rep. of Korea ................. 1996 16135

[51] Int. Cl.$^6$ .................................................. H01L 21/00
[52] U.S. Cl. .......................... 438/30; 438/34; 438/128; 438/155; 438/586; 438/609; 438/637; 257/59; 257/350; 257/353
[58] Field of Search ............................... 438/30, 34, 128, 438/151, 155, 586, 608, 609, 637, 183, 349; 257/59, 353, 350

[56] References Cited

U.S. PATENT DOCUMENTS

| | | | |
|---|---|---|---|
| 5,166,085 | 11/1992 | Wakai et al. | 437/40 |
| 5,414,278 | 5/1995 | Kobayashi et al. | 257/72 |
| 5,428,250 | 6/1995 | Ikeda et al. | 257/761 |
| 5,429,962 | 7/1995 | Yang | 437/40 |
| 5,478,766 | 12/1995 | Park et al. | 437/40 |
| 5,694,185 | 12/1997 | Oh | 349/46 |
| 5,737,049 | 4/1998 | Shin et al. | 349/122 |

*Primary Examiner*—John Niebling
*Assistant Examiner*—Long Pham
*Attorney, Agent, or Firm*—John P. White; Cooper & Dunham LLP

[57] ABSTRACT

Method for fabricating a liquid crystal display (LCD) suitable for enhancing its aperture ratio is disclosed, including the steps of forming a plurality of semiconductor layers on predetermined areas of a substrate and forming a first insulating layer on the entire surface of the substrate including the semiconductor layers, forming a plurality of gate lines on the first insulating layers to selectively overlap the semiconductor layers and implanting impurity ions into the semiconductor layers by using the gate lines as masks so as to form source and drain regions, forming a second insulating layer on the entire surface of the substrate including the gate lines and patterning the second insulating layer to expose a portion of each of the gate lines, forming a transparent conductive layer on the entire surface of the substrate including the gate lines and patterning the transparent conductive layer to form a storage electrode on the second insulating layer over each of pixel regions in contact with the exposed portion of each of the gate lines, forming a third insulating layer on the entire surface of the substrate including the storage electrode and forming a pixel electrode on the third insulating layer over a pixel region in contact with a drain region of the semiconductor layer, and forming a fourth insulating layer on the entire surface of the substrate including the pixel electrode and forming a plurality of data lines on the fourth insulating layer in contact with the source region in the semiconductor layers.

5 Claims, 4 Drawing Sheets

F I G.3
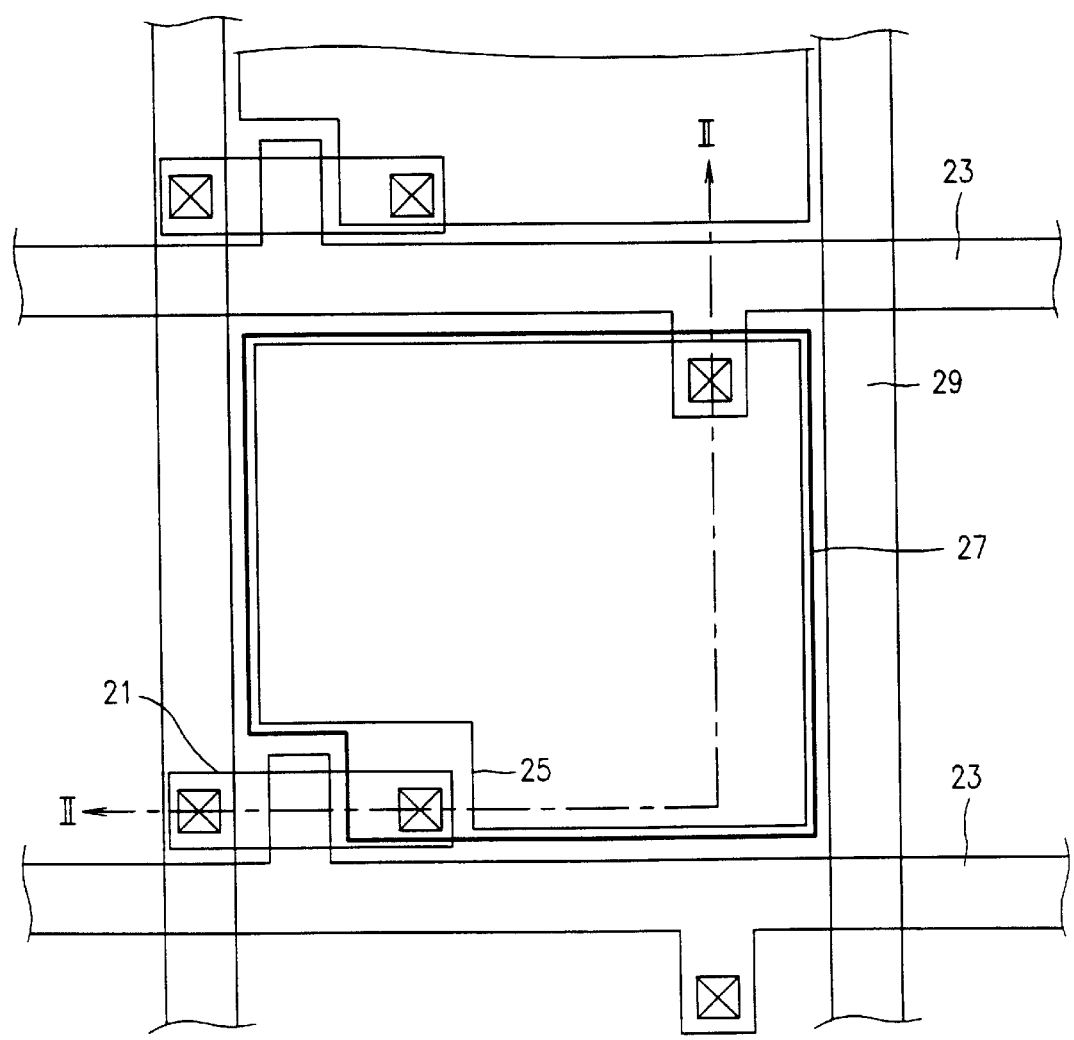

METHOD FOR FABRICATING LIQUID CRYSTAL DISPLAY

BACKGROUND OF THE INVENTION

1. Field of the Invention

The present invention relates to a liquid crystal display (LCD) and, more particularly, to a method for fabricating an LCD suitable for enhancing its aperture ratio.

2. Discussion of the Related Art

A conventional method for fabricating an LCD will be described with reference to the accompanying drawings.

FIG. 1 is a layout of a conventional LCD. As shown in FIG. 1, a plurality of gate lines 5 having a regular distance therebetween are formed in a direction. And a plurality of data lines 8 are formed to intersect the plurality of gate lines 5 at right angle thereto. And a pixel electrode 10 is formed on each pixel region. Semiconductor layers 2 are formed that each of the semiconductor layers 2 is connected to the pixel electrodes 10 and the data line 8. Each of storage electrodes 6, formed in the same direction in which the gate lines 5 are formed, overlaps the semiconductor layers 2.

FIGS. 2A to 2e are cross-sectional views showing process steps of a method for fabricating an LCD, taken along line I—I of FIG. 1.

Referring initially to FIG. 2A, an island-shaped semiconductor layer 2 is formed on a predetermined area of a transparent substrate 1 and a first insulating layer 3 is then formed on the entire surface of the substrate 1 including the semiconductor layer 2.

Referring to FIG. 2B, a photo resist film 4 is formed on the first insulating layer 3 and patterned until the first insulating layer 3 is exposed over a placement of a storage electrode. Using the photo resist pattern 4 as a mask, impurity ions are implanted into the semiconductor layer 2 over the placement of a storage electrode.

Referring to FIG. 2C, the remaining photo resist film 4 is removed. Subsequently, a first conductive material, which is not transparent, is formed on the first insulating layer 3 and patterned to form a gate line 5 and a storage electrode 6 over the semiconductor layer 2. Next, using the gate line 5 and the storage electrode 6 as masks, impurity ions are implanted into the semiconductor layer 2 to form source and drain regions in the semiconductor layer 2.

Referring to FIG. 2D, a second insulating layer 7 is formed on the entire surface of the substrate 1 including the gate line 5 and the storage electrode 6 and then the first and second insulating layers 3 and 7 are etched over a predetermined area to expose the surface of the source region in the semiconductor layer 2. As a result, there is formed a first contact hole. Thereafter, a second conductive material, which is not transparent, is formed on the second insulating layer 7 and patterned to form a data line connected to the semiconductor layer 2 through the first contact hole.

Referring to FIG. 2E, a third insulating layer 9 is formed on the entire surface of the substrate 1 including the data line 8. Then, the first, second, and third insulating layers 3, 7, and 9 are selectively etched to expose the surface of the drain region in the semiconductor layer 2, thereby forming a second contact hole. Next, a transparent conductive material such as indium tin oxide (ITO) is formed on the third insulating layer 9 and patterned so as to form a pixel electrode 10 which contacts the semiconductor layer 2 through the second contact hole, thereby completing the process steps of a method for fabricating an LCD.

However, the conventional method for fabricating an LCD has the disadvantage. Since a non-transparent material is used to form storage electrodes, an aperture ratio of the LCD becomes inferior.

SUMMARY OF THE INVENTION

Therefore, the present invention is directed to a method for fabricating an LCD that substantially obviates one or more of problems due to limitations and disadvantages of the related art.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating an LCD includes the steps of forming a plurality of semiconductor layers on predetermined areas of a substrate and forming a first insulating layer on the entire surface of the substrate including the semiconductor layers, forming a plurality of gate lines on the first insulating layers to selectively overlap the semiconductor layers and implanting impurity ions into the semiconductor layers by using the gate lines as masks so as to form source and drain regions, forming a second insulating layer on the entire surface of the substrate including the gate lines and patterning the second insulating layer to expose a portion of each of the gate lines, forming a transparent conductive layer on the entire surface of the substrate including the gate lines and patterning the transparent conductive layer to form a storage electrode on the second insulating layer over each of pixel regions in contact with the exposed portion of each of the gate lines, forming a third insulating layer on the entire surface of the substrate including the storage electrode and forming a pixel electrode on the third insulating layer over a pixel region in contact with a drain region of the semiconductor layer, and forming a fourth insulating layer on the entire surface of the substrate including the pixel electrode and forming a plurality of data lines on the fourth insulating layer in contact with the source region in the semiconductor layers.

In another aspect of the invention, an LCD is characterized in that a storage electrode is made of ITO.

In still another aspect of the invention, an LCD is characterized in that pixel electrodes and storage electrodes are made of an identical material.

It is to be understood that both the foregoing general description and the following detailed description are exemplary and explanatory and are intended to provide further explanation of the invention as claimed.

BRIEF DESCRIPTION OF THE DRAWINGS

These and various other objects, features, and advantages of the present invention will be readily understood with reference to the following detailed description read in conjunction with the accompanying drawings, in which:

FIG. 3 is a layout of an LCD according to the present invention; and

DETAILED DESCRIPTION OF THE PREFERRED EMBODIMENTS

Reference will now be made in detail to the preferred embodiments of the present invention, examples of which are illustrated in the accompanying drawings.

As shown in FIG. 3 which is a layout of an LCD according to the present invention, island-shaped semiconductor layers 21 are formed on predetermined areas of a substrate. Each of a plurality of gate lines 23, having a regular distance therebetween, is formed in a direction to partially overlap the semiconductor layers. A plurality of data lines 29 having a regular distance intersect a plurality of the gate lines 23 at right angle thereto, in contact with the semiconductor layers 21. A pixel electrode 27 is formed to contact each of the semiconductor layers 21 and not to overlap the data lines 29. A storage electrode 25 is formed to contact each of the gate lines 23 and to overlap the pixel electrode 27.

FIGS. 4a to 4e are cross-sectional views showing process steps of a method for fabricating an LCD, taken along line II—II of FIG. 3, according to a preferred embodiment of the present invention.

Figure 1:
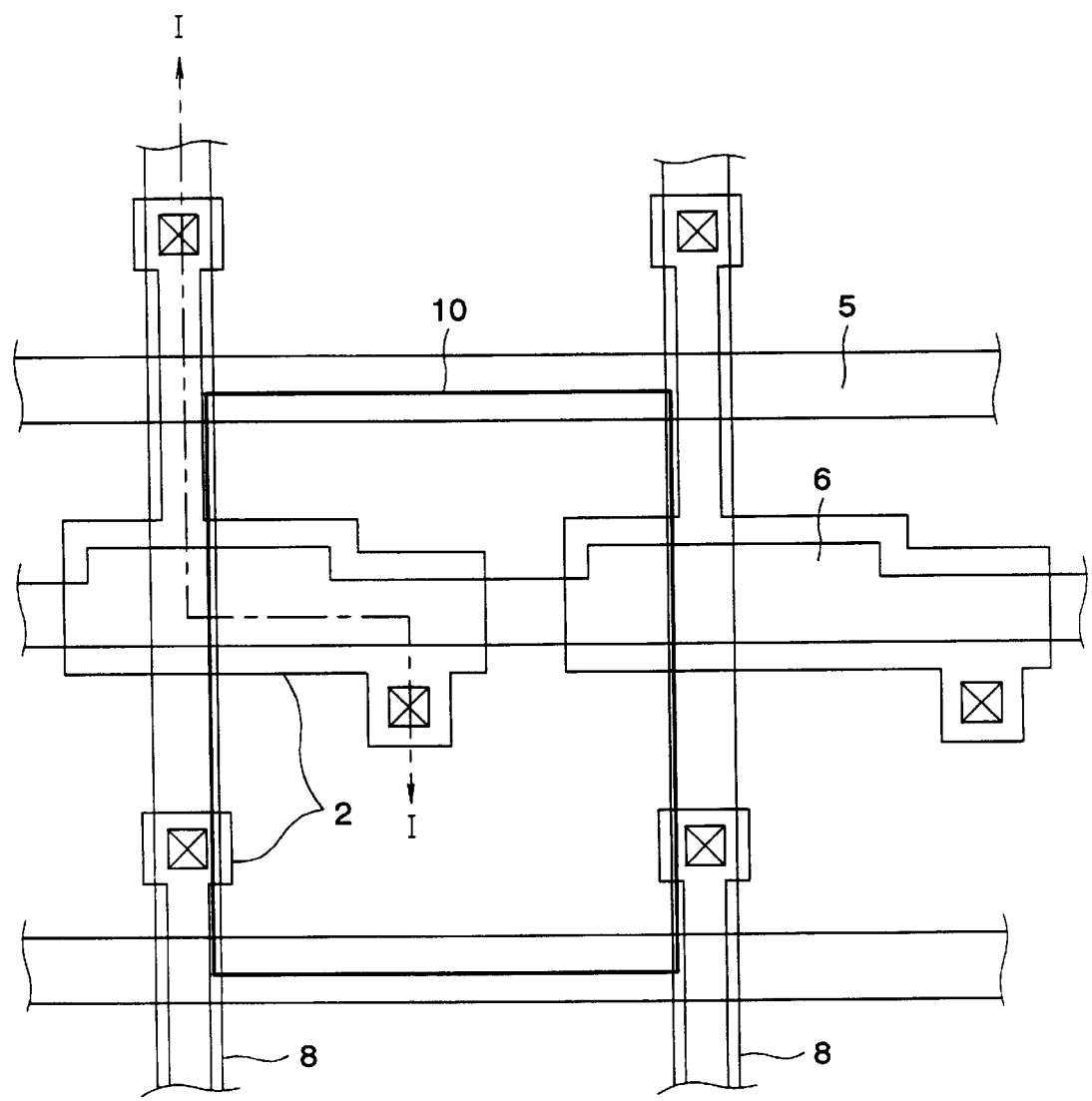
FIG. 1 is a layout of a conventional LCD.
Figure 2A:
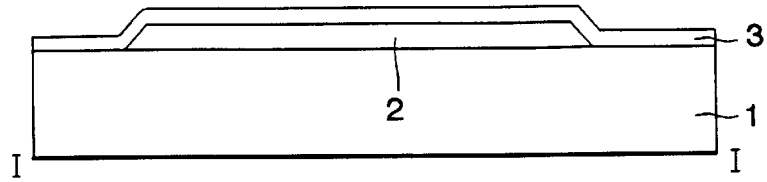
FIGS. 2a to 2e are cross-sectional views showing process steps of a conventional method for fabricating an LCD, taken along line I—I of FIG. 1.
Figure 2B:
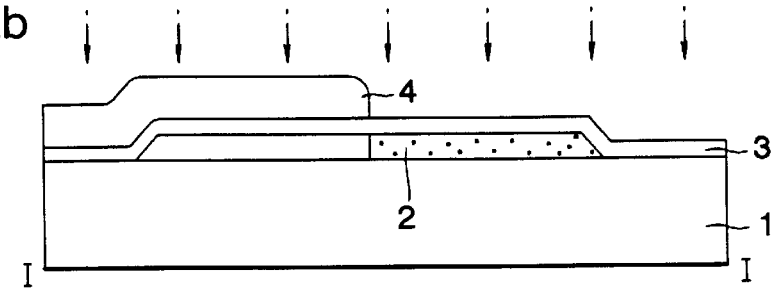
Figure 2C:
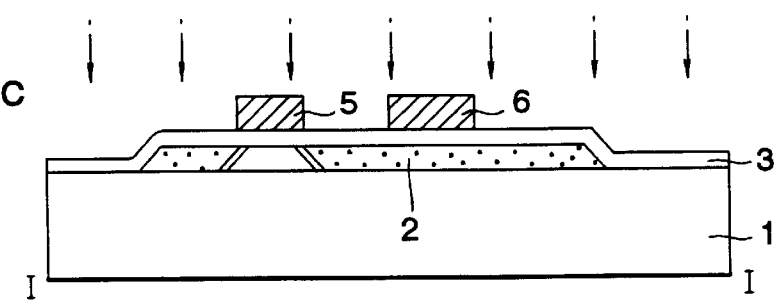
Figure 2D:
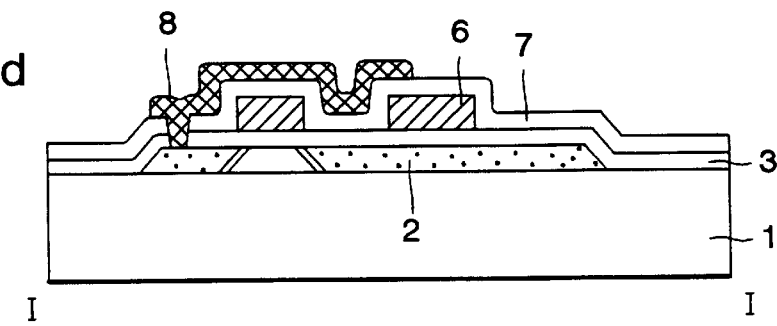
Figure 2E:
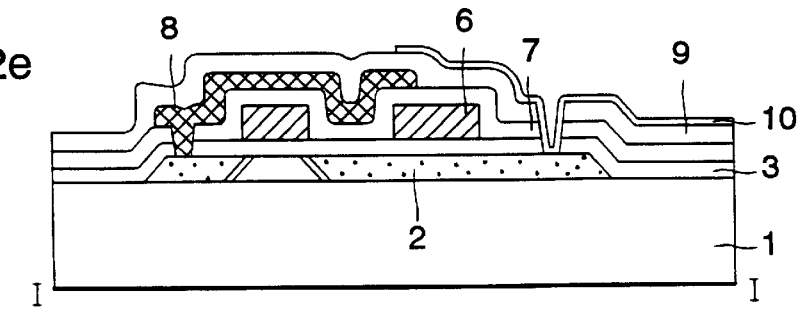
Figure 4A:
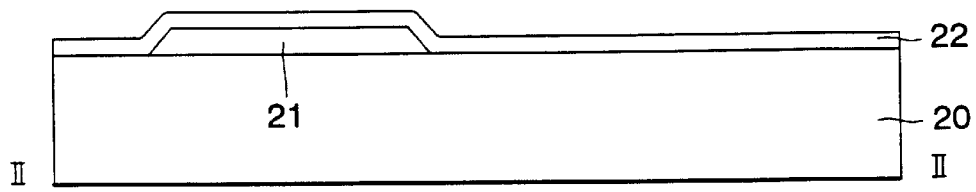
FIGS. 4a to 4e are cross-sectional views showing process steps of a method for fabricating an LCD, taken along line II—II of FIG. 3, according to a preferred embodiment of the present invention.

Referring initially to FIG. 4A, an island-shaped semiconductor layer 21 is formed on a predetermined area of a transparent, insulating substrate 20 made of, e.g., glass or quartz. Subsequently, a first insulating layer 22 is formed on the entire surface of the substrate 20 including the semiconductor layer 21.

Figure 4B:
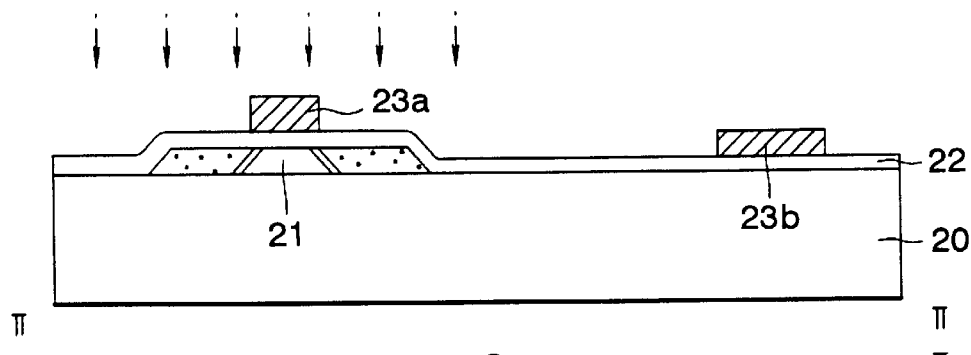

Referring to FIG. 4B, a material to form a gate electrode is formed on the first insulating layer 22 and then patterned to form first and second gate lines 23a and 23b which, having a predetermined distance therebetween, partially overlap the semiconductor layers 21. Next, using the first and second gate lines 23a and 23b as masks, impurity ions are implanted into the substrate 20 to form source and drain regions in the semiconductor layer 21.

Figure 4C:
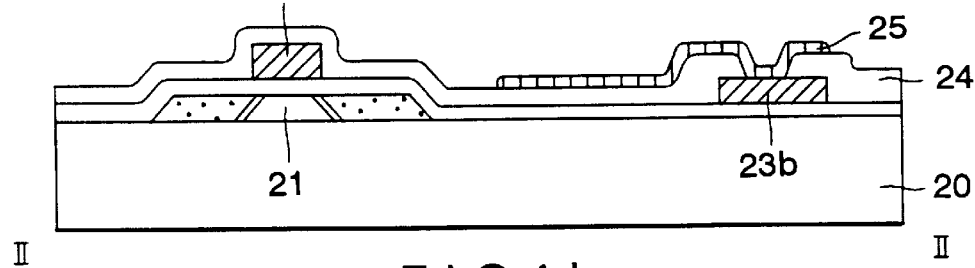

Referring to FIG. 4C, a second insulating layer 24 is formed on the entire surface of the substrate 20 including the first and second gate lines 23a and 23b and then partially etched to expose a portion of the second gate line 23b, thereby forming a first contact hole. A first transparent conductive layer made of, e.g., ITO is formed on the second insulating layer 24 and then patterned to form a storage electrode 25 which contacts the second gate line 23b through the first contact hole.

Figure 4D:
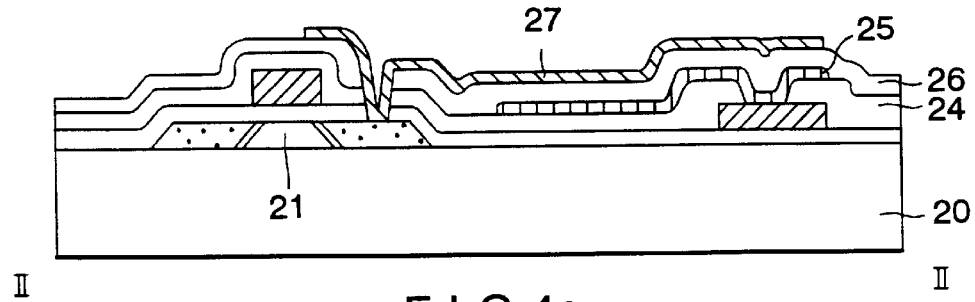

Referring to FIG. 4D, a third insulating layer 26 is formed on the entire surface of the substrate 20 including the storage electrode 25. Next, the first, second, and third insulating layers 22, 24, and 26 are partially etched to form a second contact hole. A second transparent conductive layer made of, e.g., ITO is formed on the third insulating layer 26 and then patterned to form a pixel electrode 27 which contacts the drain region through the second contact hole and fully overlaps the storage electrode 25.

Figure 4E:
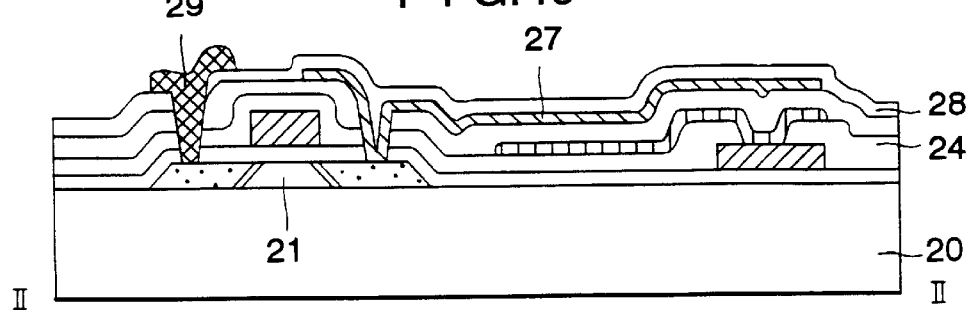

Referring to FIG. 4E, a fourth insulating layer 28 is formed on the entire surface of the substrate 20 including the pixel electrode 27. Then, the first, second, third, and fourth insulating layers 22, 24, 26, and 28 are partially etched to expose the surface of the source region of the semiconductor layer 21, thereby forming a third contact hole. A metal layer is formed the fourth insulating layer 28 and patterned to form data lines 29 of which each contacts the source region through the third contact hole, thereby completing the process steps of a method for fabricating an LCD of the invention. At this time, the data lines 29 intersect the gate lines 23 at right angle thereto, having a predetermined distance between themselves and not overlapping the pixel electrodes 27.

The LCD of the invention has the advantage. Since a transparent conductive material, e.g. ITO, is used to form storage electrodes for a storage capacitor, light is penetrable to a region of the storage capacitor, and thus advancing an aperture ratio of the LCD.

It will be apparent to those skilled in the art that various modification and variations can be made in the method for fabricating an LCD of the present invention without departing from the spirit or scope of the inventions. Thus, it is intended that the present invention cover the modifications and variations of this invention provided they come within the scope of the appended claims and their equivalents.

What is claimed is:

1. A method for fabricating a liquid crystal display (LCD) having pixel regions of matrix form and gate lines at right angle to data lines among the pixel regions, comprising the steps of:

forming a plurality of semiconductor layers on areas of a substrate and forming a first insulating layer on the entire surface of the substrate including the semiconductor layers;

forming a plurality of gate lines on the first insulating layers to selectively overlap the semiconductor layers and implanting impurity ions into the semiconductor layers by using the gate lines as masks so as to form source and drain regions;

forming a second insulating layer on the entire surface of the substrate including the gate lines and patterning the second insulating layer to expose a portion of each of the gate lines;

forming a transparent conductive layer on the entire surface of the substrate including the gate lines and patterning the transparent conductive layer to form a storage electrode on the second insulating layer over each of pixel regions in contact with the exposed portion of each of the gate lines;

forming a third insulating layer on the entire surface of the substrate including the storage electrode and forming a pixel electrode on the third insulating layer over a pixel region in contact with a drain region of the semiconductor layer; and forming a fourth insulating layer on the entire surface of the substrate including the pixel electrode and forming a plurality of data lines on the fourth insulating layer in contact with the source region in the semiconductor layers.

2. The method as claimed in claim 1, wherein the storage electrode is made of indium tin oxide (ITO).

3. The method as claimed in claim 1, wherein the data lines are formed not to overlap the pixel electrode.

4. The method as claimed in claim 1, wherein the storage electrode and the pixel electrode are made of an identical material.

5. The method as claimed in claim 1, wherein the pixel electrode fully overlap the storage electrode.

* * * * *